ASYNCHRONOUS SINGLE SIDEBAND RADIO RECEPTION SYSTEMS

Filed July 26, 1965 2 Sheets-Sheet 1

INVENTOR
HERBERT B. VOELCKER, JR.

BY Stowell & Stowell

ATTORNEYS

April 21, 1970 H. B. VOELCKER, JR 3,508,155

ASYNCHRONOUS SINGLE SIDEBAND RADIO RECEPTION SYSTEMS

Filed July 26, 1965 2 Sheets-Sheet 2

INVENTOR
HERBERT B. VOELCKER, JR.

BY Stowell & Stowell

ATTORNEYS

United States Patent Office 3,508,155

Patented Apr. 21, 1970

3,508,155

ASYNCHRONOUS SINGLE SIDEBAND RADIO RECEPTION SYSTEMS

Herbert B. Voelcker, Jr., Rochester, N.Y., assignor to Research Corporation, New York, N.Y., a non-profit corporation of New York Filed July 26, 1965, Ser. No. 474,600
Int. Cl. H04b *1/68, 1/06*
U.S. Cl. 325—329 22 Claims

ABSTRACT OF THE DISCLOSURE

A system of radio communication employing single sideband (SSB) modulation. Asynchronous demodulation of conventional SSB signals is accomplished using only envelope properties. A carrier component of a certain minimal strength is added to the signal to provide for distortionless reception. The phase modulation component of such a constrained SSB signal is uniquely related to the envolep and may be generated from the envelope. The phase and envelope components define the SSB signal completely, and may be used in various mathematically equivalent ways to recover the modulating signal.

The present invention relates to a communication system utilizing a single-sideband modulation technique, and more specifically to a non-synchronous or so-called Asynchronous Single-sideband Modulation System. These general and more specific types of modulation will be referred to hereinafter as SSB and ASSB, respectively.

SSB modulation systems are known which produce voice-modulated radio signals for transmission at carrier frequencies up through the 3–30 megacycle high frequency band, and these may be extended into higher frequency bands. Such known SSB modulation transmission techniques may be utilized to generate modulated signals wherein the radio frequency carrier is either suppressed, reduced, or in certain systems permitted to be transmitted at full carrier amplitude.

It is apparent that SSB systems are, from the question of radiated radio frequency power and band-width requirements, known improvements over double-side band systems such as amplitude modulation. Known SSB systems are described in the first several papers appearing in Proc. I.R.E., vol. 44, No. 12, December 1956. It will be noted, however, that such decreased band width requirements and increased transmission efficiency are met only by the necessity for more costly and elaborate receivers for such SSB signals.

SSB cannot be received, that is demodulated distortionlessly with conventional amplitude modulation receivers. In general, SSB demodulation requires some form of a synchronous detector which is utilized to translate the radio frequency SSB signals downward to the ultimate audio or voice frequency band. Known techniques for the demodulation of the SSB signals are identified as (1) pilot carrier techniques, (2) brute-force stability, and (3) full-carrier transmission.

The demodulation method (1) identified above depends upon the principle of permitting a small amount of radio frequency carrier energy to be transmitted along with a single sideband. It is possible at the receiver to synchronize a local oscillator to such low level carrier, and thus to effect translation downward in a conventional heterodyne stage or stages.

The method (2) relies upon the factor of the availability at both the transmitter and the receiver of radio frequency oscillators which are sufficiently stable and drift-free. "Quasi-synchronous" demodulation may thus be accomplished at the receiver without the necessity of a transmitted carrier reference or pilot frequency.

The method (2) is called "quasi-synchronous" because some frequency error will always exist. For speech or voice frequency transmission, frequency errors of the order of 30 cycles per second may be tolerated. It should be noted, however, that the oscillator stability requirements must be increased in proportion to the radio frequency in order to satisfy such criterion. For example, an oscillator whose intrinsic stability is one part in $(10)^6$ would yield a one c.p.s. error at a one megacycle (mc.p.s.) carrier frequency, and a one kc.p.s. error at a one kilomc.p.s. (1 gc.p.s.) carrier frequency. A SSB speech system using a pair of such oscillators would be usable at carrier frequencies up to about 15 mc.p.s. If other than voice frequency transmission is desired, such as the transmission of information whose temporal wave shape or wave form must be retained, then one cannot tolerate either frequency or phase errors in the demodulation process.

The method (3) full-carrier transmission relies upon the fact that if a strong carrier frequency component is radiated along with the selected sideband signal, a conventional envelope detection receiver may be used for demodulation if some output distortion may be tolerated. The amount of distortion varies inversely with carrier strength. Practical transmitter designs, which cannot afford to transmit a relatively massive carrier at the expense of sideband power, yield output distortions at the receiver of the order of 10–25%.

In the prior art method (1) has often been used in landline multiplex telephony and in certain commercial radio circuits. Method (2) is widely used in military aviation, and in many other voice radio systems. Method (3) has been used mainly as a standby facility, for example, to overcome equipment failure and down-time.

Any of the above three methods of SSB transmission offer practical problems, and it is an object of the present invention to solve such problems by means of a non-synchronous single sideband modulation system.

If the receiving requirement of each of the two distortionless methods of SSB modulation described above, that is, the synchronous demodulation requirement in (1) and (2), could be efficiently circumvented then SSB usage would undoubtedly increase.

In order to improve upon and overcome the requirement of the conventional SSB system that the demodulation be performed in a synchronous manner, there are at least two possible approaches. In their broadest form each of these rely upon the possibility of transmitting a particular type of SSB signal which can be received compatibly upon an existing conventional, or almost conventional, amplitude modulation receiver. One approach results in the so-called compatible single sideband system, or CSSB, as shown by the prior art of Kahn, U.S. Patent No. 2,989,707, or of Powers, U.S. Patent No. 2,987,683, Such compatible SSB systems require a highly complex transmitter arrangement.

An alternative approach requires the asynchronous single-sideband system of the present invention. For reasons of technical convenience, a conventional or near-conventional SSB modulated carrier wave is transmitted. And a suitable receiving technique, which may be more complex than that of the CSSB receiver, is provided in order to extract the required modulation information from the envelope of the conventional SSB signal.

Accordingly, it is an object of the present invention to modulate and transmit a SSB form of information signal by conventional means known in the art; the so-called "filter" method, or the "phasing" method; and to add thereto a sufficient carrier power amplitude to permit distortionless asynchronous demodulation utilizing envelope detection at the receiver.

It is a further and more specific object of the present invention to provide a receiver for asynchronous single sideband demodulation which relies upon a known type of envelope detection and further improves thereon so that, as mathematically proven hereinafter, the inherent distortion of the earlier-described method (3) system may be reduced or eliminated entirely.

In the several embodiments of the invention described hereinafter the implementation of the receiver demodulator system for the detection of an asynchronous single sideband signal will be described in varying forms which require either a direct, exact, and possibly expensive converter circuit arrangement; an indirect circuit arrangement whose complexity and expense requirements may not be so great as those of the direct circuit; and a further circuit arrangement which eliminates the so-called "square law" distortion and particularly provides a simplification of the receiver demodulator which is less expensive and thus may be more commercially attractive.

The principles of the invention will become more readily apparent from the following detailed discription of the several embodiments thereof, when taken in accompaniment with the drawings, wherein.

Figure 1:
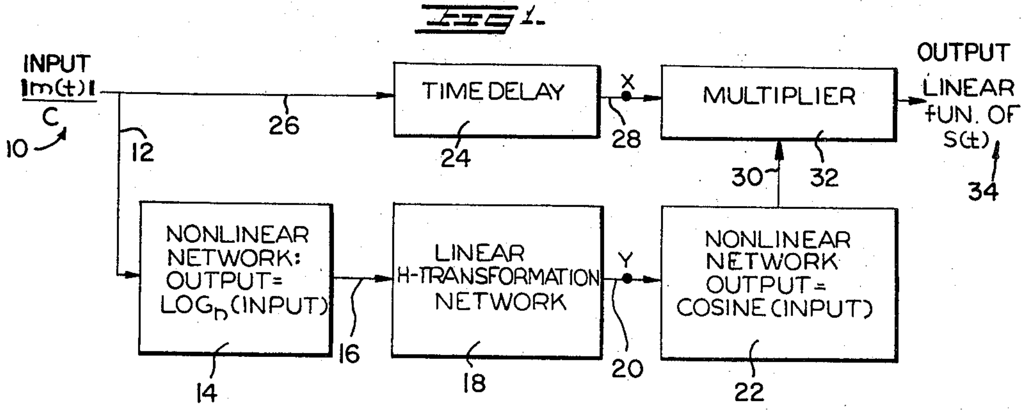
FIGURE 1 is a block diagram of a portion of a receiver for an ASSB system which illustrates the particular steps in the method of demodulation which are provided by the present invention; to be referred to hereinafter as a converter.

It should be understood that asynchronous SSB is a generalization of the compatible SSB modulation concept as illustrated by the prior art patents of Kahn and Powers referenced above. An important distinction is that relatively complicated operations on the signal envelope are possible in a receiver for asynchronous systems, such as those of the present invention; whereas only simple operations are permissible in the receivers for the compatible systems. This is due to the fact that in the so-called compatible systems a standard amplitude modulation receiver is to be utilized with little or no modifications thereof permissible.

In both types of systems the problem is to avoid synchronous demodulation which requires the transmission of a pilot frequency, synchronous oscillator control, and the other difficulties previously outlined. In order to avoid such asynchronous demodulation problems some form of envelope detection and processing is utilized in the receiver according to the present invention.

Two approaches are possible in theory. A convenient modulating functional may be chosen at the transmitter modulator in order to encode the information signal, and then additional functionals may be utilized to satisfy the necessary band width requirements. This is the approach which has been used in compatible systems of the prior art, and the aforesaid information signal functional and band width information functionals are encoded by means of a rather complex transmitting modulation arrangement. This is necessary due to the fact that the primary functional, which is to provide linear envelope modulation, is dictated by the receiver simplicity constraint. The alternative approach, utilized according to the present invention, is to start at the transmitter with a less complex modulated wave which will both contain the information signal and satisfy the band width constraints, and to then provide receiver demodulation techniques which extract the desired information from the envelope of the detected signal.

The above alternative approach underlies the ASSB system described hereinafter. A conventional SSB transmitted wave is utilized, which wave contains the informatoin signal and satisfies the bandwith constraint by definition. The technology of generating such SSB modulated waves is well known in the prior art.

By means of the present invention, ASSB, it is possible to fix the general form of the transmitted wave, usually for reasons of technical convenience, and to then provide a suitable receiver configuration. In prior known compatible SSB systems the reverse of this process has been used.

The conditions under which a conventional SSB wave can be asynchronously demodulated without distortion will next be discussed. Such discussion will show that a carrier component must be present, and will furnish a constructive mathematical specification for the ASSB receiver. A detailed description of the several drawing figures will follow to illustrate the several practical forms for the implementation of the ASSB system of this invention. Certain mathematical results will be stated without proof. The proofs are contained in, "Toward a Unified Theory of Modulation," H. Voelcker, submitted to Proceedings I.E.E.E., and in, "Demodulation of Single-sideband Signals via Envelope Detection," H. Voelcker, submitted to I.E.E.E. Transactions on Communication Technology. This latter paper is from I.E.E.E. Transactions on Communication Technology, vol. COM–14, No. 1, February 1966, pages 22–30.

PROPERTIES OF SSB WAVES

Let $s_{SSB}(t)$ denote the SSB-modulated form of an information signal $s(t)$ . . . . speech, say, or some other essentially band-limited, essentially lowpass wave. The relevant equation for the SSB form of $s(t)$ is:

$$s_{SSB}(t)=s(t)\cos\omega_0 t-\hat{s}(t)\sin\omega_0 t \qquad (1)$$

where:

$\hat{s}(t)=H[s(t)]$, the Hilbert transforms of $s(t)$, i.e. $s(t)$ passed through a linear network which shifts the phase of each frequency component in $s(t)$ by exactly $-90°$ but does not change the magnitudes of the components.

$\omega_0$=carrier frequency in radians/sec. which is generally "large," e.g. $2\pi 455$ kc.p.s., etc.

(1) described an upper-sideband wave. The lower-sideband form contains a (+), rather than a (−).

Equation 1 can also be written:

$$s_{SSB}(t)=Re[m(t)\exp(j\omega_0 t)],\quad j=\sqrt{-1} \qquad (2)$$

where:

$$m(t)=s(t)+j\cdot\hat{s}(t) \qquad (3)$$

and "Re" means "real part of." Also:

$$\begin{aligned}s_{SSB}(t)&=Re[|m(t)|\cdot\exp\{j[\omega_0 t+\phi(t)]\}]\\&=|m(t)|\cdot\cos[\omega_0 t+\phi(t)]\end{aligned} \qquad (4)$$

where:

$$|m(t)|=[s^2(t)+\hat{s}^2(t)]^{1/2}=\text{envelope of } s_{SSB}(t) \quad (5)$$

$$\phi(t)=\text{arc tan } [\hat{s}(t)/s(t)]=\text{phase-modulation component of } s_{SSB}(t) \quad (6)$$

$$m(t)=|m(t)|\cdot\exp[j\phi(t)] \quad (7)$$

It follows that:

$$s(t)=|m(t)|\cdot\cos\phi(t) \quad (8)$$

$$\hat{s}(t)=|m(t)|\cdot\sin\phi(t) \quad (9)$$

A synchronous frequency-translating demodulator, in effect, multiplies $s_{SSB}(t)$ by a locally generated carrier wave and then eliminates from the product, via a lowpass filter, all but low-frequency spectral components. Suppose the local oscillator has a constant frequency error $\epsilon$ and a constant phase error $\theta$, both relative to $\omega_0 t$. Then, using (1), the sync. demod. output is:

$$\text{Lowpass-Components-of } [s_{SSB}(t)\cdot \overbrace{\cos\{(\omega_o+\epsilon)t+\theta\}}^{\text{from local oscillator}}] = \text{L.P.}-\text{Comp.}-\text{of } \tfrac{1}{2}\{s(t)\cos(\epsilon t+\theta) + \hat{s}(t)\sin(\epsilon t+\theta)-s(t)\sin[(2\omega_o+\epsilon)t+\theta] + \hat{s}(t)\cos[(2\omega_o+\epsilon)t+\theta]\}=\tfrac{1}{2}[s(t)\cos(\epsilon t+\theta) + \hat{s}(t)\sin(\epsilon t+\theta)] \quad (10)$$

If $\epsilon$ and $\theta$ are both 0, synchronism is perfect, and the output is $s(t)/2$. If $\epsilon=0$ but $\theta\neq0$, the output is a linear combination of $s(t)$ and $\hat{s}(t)$ which does not "look like" $s(t)$ in the time domain unless $\theta$ is quite small. For both $\epsilon$, $\theta\neq0$, the output is even more distorted. In speech transmission one may tolerate $\epsilon$'s up to about $60\pi$, but for waveform preservation, as necessary in direct data transmission, $\epsilon$ must be 0 and $\theta$ must be small.

An ASSB system cannot use such a synchronous demodulation process, however, because knowledge of $\omega_o$ is unavailable by hypothesis. The ASSB system must extract $s(t)$ from the envelope $|m(t)|$ because $|m(t)|$ is frequency independent and can be found readily via envelope detection.

From (8) it follows that $s(t)$ can be calculated from $|m(t)|$ if $\phi(t)$ is known. This can be calculated readily only in the context of analytic signal theory. Briefly: $m(t)$ as given by (3) is an analytic function in the upper half of a $z=t+j\sigma$ plane because its real and imaginary parts are a Hilbert-transform pair. If (and only if) the natural logarithm of $m(t)$ is analytic in the same upper half plane (U.H.P.), then its real and imaginary parts will also be a Hilbert pair, But $$\ln m(t)=\ln|m(t)+j\phi(t) \quad (11)$$

where "ln" means natural or Naperian logarithm. Thus, if ln $m(t)$ is analytic, $\phi(t)$ can be determined uniquely from $|m(t)|$, viz $$\phi(t)=H[\ln|m(t)|]=\widehat{\ln|m(t)|} \quad (12)$$

if ln $m(t)$ is analytic in U.H.P.

Therefore if given ln $m(t)$ analyticity, to calculate $\phi(t)$ one need merely calculate the ln of the envelope $|m(t)|$ and then take the H-transform of the result, i.e. phase-shift all frequency components of ln $|m(t)|$ by $-90°$, leaving amplitudes of the frequency components unaffected.

Note that (12) is ostensibly ambiguous in that an arbitrary scale factor apparently may be assigned to the envelope; i.e.

$$H\{\ln k|m(t)|\}=H\{\ln|m(t)|\} \quad (12a)$$

because $H\{\ln k\}=0$. But if one writes $$\exp[\ln k|m(t)|+j\cdot H\{\ln k|m(t)|\}]=k\cdot\exp[\ln|m(t)|+j\cdot H\{\ln|m(t)|\}]=k\cdot m(t) \quad (12b)$$

it is obvious that logarithmic analyticity is mathematically independent of such scale factors. The scale factor question has practical relevance, however, because it imposes a requirement for normalization or automatic gain control which will be recited hereinafter.

If ln $m(t)$ is analytic in the U.H.P., then $\phi(t)$ can be calculated from the envelope $|m(t)|$. Once $\phi(t)$ is known, then $s(t)$—the desired output—can be calculated via (8).

Analyticity means that ln $m(t)$ has no singularities in the UHP. If singularities exist, they are attributable to but one source—complex zeros of $m(t)$ located in the UHP. Thus, in effect, ASSB is possible if $m(t)$ has no UHP zeros. By modifying the function in a simple manner it is possible to ensure that it has no UHP zeros. Specifically, it can be shown that if one adds a constant to either the real or the imaginary part of $m(t)$ so that the affected part is never negative (or never positive), UHP zeros cannot occur and hence ASSB is possible.

For the present discussion adopt the convention that the constant is added to the real part of $m(t)$ such that it is never negative. The modified $m(t)$ function is $$m_c(t)=c+s(t)+j\cdot\hat{s}(t),\ c+s(t)\geq0 \quad (13)$$

A result of this modification is that the phasing function as given by (6) becomes $$\phi_c(t)=\text{arc tan}\left\{\frac{\hat{s}(t)}{c+s(t)}\right\},\ c+s(t)\geq0 \quad (14)$$

and clearly $|\phi_c(t)|\leq\pi/2$. Angles greater than $|\pi/2|$, which can introduce trigonometric ambiguity and frequency translation if cumulative, are specifically precluded by the addition of $c$ to $s(t)$.

The modified equation corresponding to (1) is:

$$s_{ASSB}(t)=[c+s(t)]\cos\omega_0 t-\hat{s}(t)\sin\omega_0 t,\ c+s(t)\geq0 \quad (15)$$

The practical effects of the $c$-addition are clear. Adding $c$ to $s(t)$ such that $[c+s(t)]\geq0$ simply adds a carrier component at $\omega_0$ to the spectrum. The $c$-constraint is essentially identical to the constraint imposed on conventional amplitude-modulation transmitters to avoid overmodulation. The amplitude-modulation form of $s(t)$ is $$s_{AM}(t)=[c+s(t)]\cos\omega_0 t \quad (16)$$

and $s(t)$ can be recovered from $s_{AM}(t)$ by conventional envelope detection if $[c+s(t)]\geq0$. In ASSB the same constraint limits the phase deviation and permits asynchronous demodulation.

The ASSB signal given by (15) is not identical to the conventional SSB signal given by (1), but the difference is only the constant, $c$, which corresponds to a carrier component at $\omega_0$. The ASSB signal is merely a non-suppressed-carrier SSB signal. The transmission efficiency of ASSB is lower because some of the transmitted power resides in the carrier component. It is readily shown that an ASSB signal of this invention can be received on a conventional synchronous-demodulation SSB receiver of the previously described methods (1) or (2); by using (15) rather than (1) to derive (10).

One practical form of an ASSB receiver which will perform signal demodulation in the manner described by the foregoing mathematical steps is illustrated in FIG. 1. Five steps are necessary to effect such demodulation, which are:

(I) Generate the normalized envelope $|m(t)|\div c$ via conventional envelope detection. Normalization, i.e. division of $m(t)$ by $c$, is needed in a practical system to avoid the scale factor ambiguity of (12a) and (12b) and it is equivalent to, and may be effected by, automatic gain control, for which techniques are well known in the art. Hereafter, as used in the specification and claims, the word "envelope" will denote the normalized envelope; and $c$, the carrier level, will be unity unless indicated otherwise.

(II) Take the natural logarithm of the envelope, ln.

(III) Generate the Hilbert transform of the ln of the envelope.

(IV) Generate the cosine of the result of step III.

(V) Multiply the result of step IV by the envelope itself to obtain $s(t)$, the information signal, plus a constant corresponding to the carrier level.

Steps II–V can be summarized via the equation $$1+s(t)=|m(t)|\cdot\cos[H\{\ln|m(t)|\}],\ 1=\text{normalized carrier level, and } 1+s(t)\geq 0 \quad (17)$$

which follows from (8) and (12).

The envelope detection, step I, may be provided by a conventional communication receiver having an automatic gain control or AGC circuit, whose normalized output, $|m(t)|\div c$, taken from an envelope detector is supplied at 10 of FIG. 1. The remaining block elements of FIG. 1 perform the signal conversion steps II–V. Thus, lead 12 connects the converter input 10 to a logarithmic circuit element 14. Block element 14 may be, for example, an appropriately biased semiconductor or thermionic electron discharge device; a multi-diode network; an analog computer-type function generator; or the like.

The output of element 14 is $\log_n$ of the input, $$\log_n|m(t)|$$

which is applied via lead 16 to a Hilbert transformation network 18 of any known type. Block element 18 may comprise, for example, cascaded or parallel phase-shift networks of the all-pass or other special types such as are used with present SSB transmitter modulators employing the phase-shift method of signal generation.

Alternatively, the Hilbert transformation element 18 may employ a wide band 90-degree tapped delay line phase shifter of the type illustrated in Powers' U.S. Patent No. 3,050,700.

The output of network 18 is a signal wave form wherein all frequency components of the input signal have been phase-shifted by 90 degrees, leaving the amplitudes of the frequency components unaffected. This meets the requirements of Equations 12 and 17. Such output is applied via lead 20 to a cosine generator indicated by block element 22, which element performs step IV of the demodulation process.

It should be noted that there is an inherent time delay in the H-transformation network 18. In order to compensate for such delay an additional but otherwise nonfunctional time delay means provided by block element 24 is placed in a parallel signal path via leads 26 and 28. The time delay of element 24 is made equal to that of element 18. Any known time delay means may be utilized such as, for example, a lumped-constant electrical delay line; a transmission line section; a mechanical delay line; a magnetic tape system; or the like.

The cosine generator 22 may consist of a nonlinear diode network; and analog computer-type function generator; or the like. Its output is conducted via lead 30 to the multiplier element 32.

Block element 32 multiplies the output of the cosine generator by the signal envelope 10 as provided via lead 26, delay means 24, and lead 28, to perform step V of the signal demodulation. Thus the output 34 from multiplier 32 is a linear function of $s(t)$, the information signal.

An analog computer-type multiplier, for example a "quarter-square" multiplier; Hall-effect multiplier; piezoelectric/magnetic multiplier; or the like may be used for block element 32.

An ASSB converter according to FIG. 1 may well prove to be an expensive device. High quality multipliers, for example, require complex circuits. This suggest that other, somewhat indirect, methods be provided for implementing the converter to produce a circuit arrangement that is simpler or less expensive.

Some of the converter operations are easier to perform on band-pass, rather than lowpass signals. A method, of which there are several variations, exploiting this facility is described hereinafter. It is based on the principle of "rebuilding" the ASSB signal as a whole or in parts, given only the envelope, at a known carrier frequency and then demodulating it synchronously. It is emphasized that all implementations of the converter, whether direct or indirect, must embody in some form the principles underlying the five steps summarized earlier.

Figure 2:
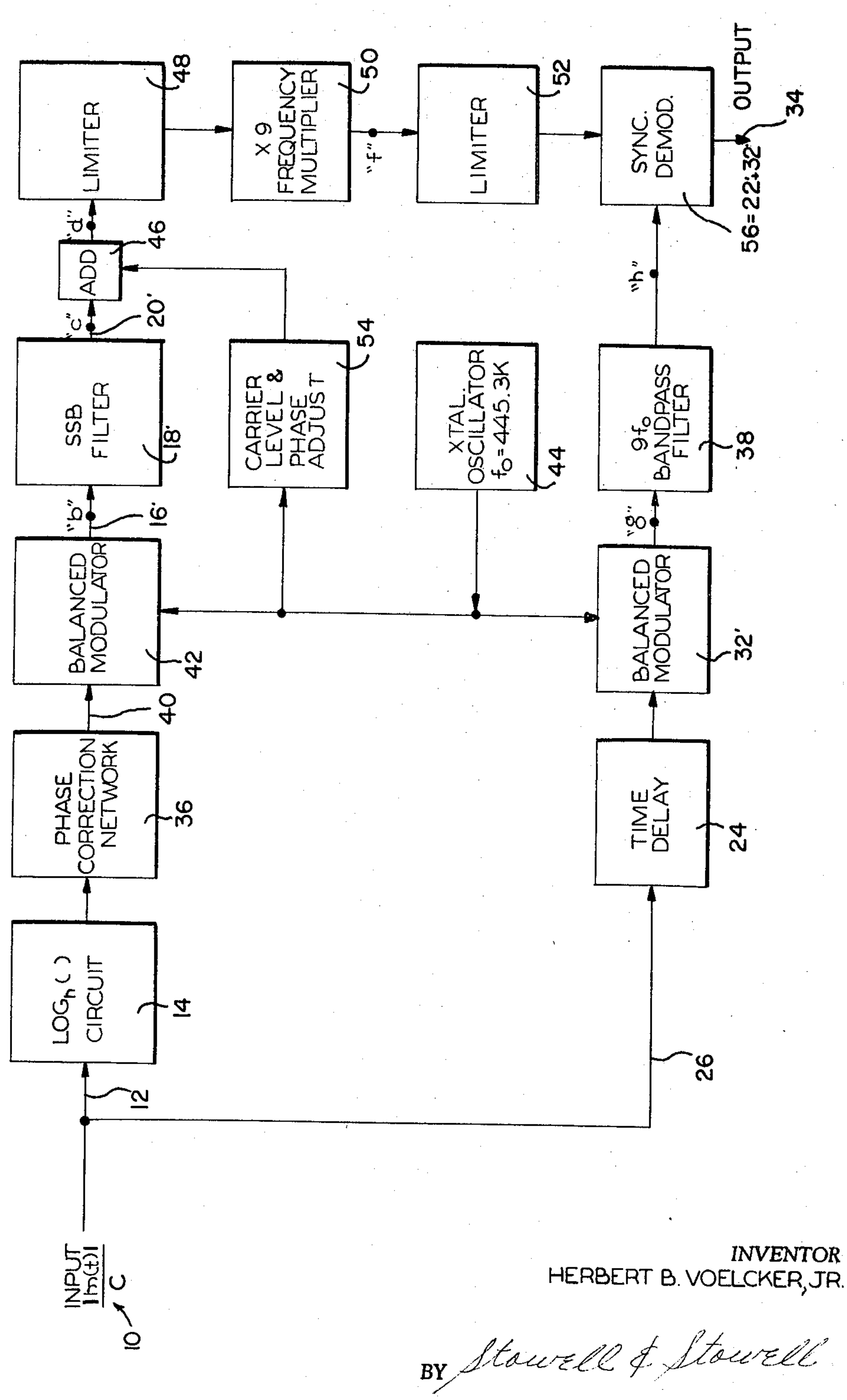
FIGURE 2 illustrates a receiver converter system according to FIGURE 1 wherein direct ideal circuit elements are utilized to perform the method steps of the demodulation process in a manner which might be termed indirect.

Referring to FIGURE 2 which illustrates one example of the invention, its operation will be described in terms of "ideal" elements. Two functional blocks are included whose sole purpose is to compensate for non-ideal behaviour. One is the phase correction network 36, which is a linear circuit which predistorts the $\ln|mt(t)|$ signal before it is modulated in the upper branch. Its purpose is to correct the nonlinear phase characteristic of the SSB filter 18' which performs the Hilbert transformation step. There are many forms this network could take. In an experimental model, a cascaded all-pass network was used.

The other functional block element is the time delay 24. In the experimental model this was a constant-K lumped-element network of about 270 $\mu$s.; this value approximated the slope of the linearized phase characteristic of the upper branch of FIGURE 2 from the input 10 to the point C. The delay network equalizes delays in the upper and lower branches. In a production model the requisite delay might be designed into, say, the $9f_o$ bandpass filter 38 in the lower branch.

The upper branch in FIG. 2 operates as follows. The log of the input signal envelope is generated in 14, which might be, for example, an appropriately biased semiconductor diode driven from a current source, not shown. The phase-pre-distorted $\ln|m(t)|$ is applied via lead 40 to a conventional balanced modulator 42 driven by a carrier of frequency $f_o$ from the oscillator 44. In the experimental model $f_o$=445.3 kc.p.s. was determined so as to match the characteristics of the SSB filter 18'. The modulator's output at 16', neglecting pre-distortion, is of the form $$X_b(t)=\ln|m(t)|\cdot\cos\omega_o t \quad (18)$$

The output of the SSB filter at 20', neglecting time delay and assuming phase linearity, is $$x_c(t)=\ln|m(t)|\cdot\cos\omega_o t-H[\ln|m(t)|]\cdot\sin\omega_o t \quad (19)$$

where H( ) denotes a Hilbert transformation.

In the adding circuit 46 between points "*c*," "*d*" a carrier component is added to the filter output. This is so phased and level-controlled by means of the series-connected element 54 that the adder output is of the form $$x_d(t)=[9+\ln|m(t)|]\cdot\cos\omega_o t-H[\ln|m(t)|]\cdot\sin\omega_o t \quad (20)$$

where 9 is the carrier level relative to the (normalized) $\ln|m(t)|$ signal. Equation 20 describes a signal whose envelope fluctuations are quite small, because of the large carrier component, and whose phase modulation component is given by $$\phi_{x_d}(t)=\text{arc tan}\left\{\frac{H[\ln|m(t)|]}{9+\ln|m(t)|}\right\} \quad (21)$$

Because the denominator in the argument of Equation 21 is relatively large and relatively constant, due to the large carrier component, one may use the following good approximation:

$$\phi_{x_d}(t)\simeq\frac{1}{9}H[\ln|m(t)|] \quad (22)$$

The approximation can be made arbitrarily good by raising the carrier level above 9. The limiter circuit 48 following point *d* may be a Schmitt trigger stage which merely removes the envelope fluctuations from (20) and yields a pulse train position-modulated by (22). The limiter circuit 48 is not always essential to proper operation of the converter, for the X9 frequency multiplier 50 which follows the limiter can be designed to operate properly with or without the limiter. The X9 frequency multiplier 50 in the experimental model was a Class C nonlinear amplifier tuned to the 9th harmonic of $f_o$. It multiplied both the frequency and phase of its input by 9, yielding:

$$x_f(t)=\cos\,[9\omega_0 t+9\phi_{xd}(t)]$$
$$\simeq\cos\,[9\omega_0 t+H\{\ln|m(t)|\}] \qquad (23)$$

It shall be noted that if the level of the carrier injected between *c, d* is raised—to 15 from 9, for example—then the frequency multiplier 50 should be tuned to the 15th harmonic of $f_0$. The experimental model illustrated in FIG. 2 shows a limiter 52 following the frequency multiplier 50. However, this is not always essential to proper operation of the converter. It merely makes the construction of the synchronous demodulator stage 56 somewhat simpler.

Turning to the lower branch of FIG. 2. The envelope input over lead 26 is delayed in the lower branch by means of the time delay element 24 and then modulated by the $f_0$ carrier from the oscillator 44 in a time-variant-linear balanced modulator 32′ which is of the switching type, and which translates the $|m(t)|$ signal to all odd harmonics of the carrier frequency. At the output one has, neglecting time delay:

$$x_g(t)=|m(t)|\cdot\cos\,\omega_0 t-\tfrac{1}{3}|m(t)|\cdot\cos\,3\omega_0 t+\tfrac{1}{5}|m(t)|\cdot\cos\,5\omega_0 t-\tfrac{1}{7}|m(t)|\cdot\cos\,7\omega_0 t+\ldots \qquad (24)$$

The $9f_0$ bandpass filter 38 following the lower modulator 32′ was a tuned linear amplifier in the experimental model which merely selected the output components near $9f_0$, yielding:

$$x_h(t)=|m(t)|\cdot\cos\,9\omega_0 t \qquad (25)$$

Here it should again be noted that if the level of the injected carrier in the upper branch is raised—to 15 from 9, for example—the filter 38 should select the 15th harmonic band. This is due to a constraint that the carrier injection level at 46 should correspond to an odd integer to correspond to one of the spectral bands in the output of the switching modulator 32′ as required by Equation 24. The carrier level at 46 must also be "large," e.g. of the order of 9 or greater, to justify the approximations giving Equation 22 from 21. An odd integer larger than 9 will yield slightly higher overall fidelity, but will also require higher-gain amplifiers in each of the branches.

The upper and lower branches meet the synchronous demodulator 56, which was of the switching type in the experimental model. It multiplies and then lowpass-filters to yield:

$$\text{Output}=\text{Lowpass}-\text{Components}-\text{of}\ |m(t)|\cdot\cos\,9\omega_0 t\cdot\cos\,[9\omega_0 t+H[\ln|m(t)|]]=\frac{1}{2}|m(t)|\cdot\cos\,[H\{\ln|m(t)|\}] \qquad (26)$$

which is the desired signal as per Equation 17.

Thus the bandpass converted of FIG. 2 effects the same overall mathematical operations as the lowpass converter of FIG. 1. While FIG. 2 may appear to be more complicated, the individual circuits are all relatively simple and their design is well understood by those skilled in the art. FIG. 2 can be simplified by suitable circuit design without changing its principles of operation. For example: the limitors 48 and 52 are not essential as noted earlier, and the $9f_0$ filter 38 can be eliminated by suitable design of 50 and 56.

The effective mathematical and circuit arrangements which are incorporated in the bandpass converter of FIG. 2 include:

The use of conventional SSB filtering at element 18′ to effect H-transformation;

The use of strong quadrature-carrier-injection to the adder 46 to effect narrow-band phase modulation;

The use of frequency multiplication by element 50 to expand the phase deviation; and The use of synchronous demodulation in block element 56 to effect both multiplication as indicated by the reference numeral 32′ and "cosine" function generation as indicated by the reference numeral 22′.

SIMPLIFIED ASSB CONVERTERS

For some applications, the exact implementations of the converter described in connection with FIG. 1 may prove to be overly expensive for the benefits they offer. Simpler types of converters, which remove some but not all of the distortion inherent in conventional envelope-detection receivers may prove to be more practical and marketable. By using various combinations of approximations to the exact mathematical operations less exact converters may be constructed.

The characteristics which make an exact converter relatively complicated are, primarily:

The several operations which cannot be implemented with conventional linear circuitry, for example in FIG. 1 the log function 14, the cosine function 22, and the multipler 32;

The relatively wide bandwidths which must be accommodated; and the delay and phase equalization problems which arise whenever H-transforms must be generated in physical devices.

In order to provide a less expensive form of an ASSB converter simplifications which alleviate the demands cited above are required. Such simplification process is illustrated with a specific example using approximation via a truncated power series; plus a method of bandwidth-compression.

Rewriting the equation for ASSB wave, (15), in normalized form . . . normalized such that the carrier strength is unity:

$$s_{ASSB}(t)=[1+as(t)]\cdot\cos\,\omega_0 t-a\hat{s}(t)\,\sin\,\omega_0 t \qquad (27)$$

where $$[1+as\,(t)]\gg 0$$

and where $a$ is a modulation-index parameter. It should be noted that thus far $a$ has been unity by convention in the envelope-normalized formulation. The symbol $a$ is inserted here for notational convenience. The corresponding envelope equation is $$|m(t)|=\text{envelope of } s_{ASSB}(t)$$
$$=[\{1+as(t)\}^2+a^2\hat{s}^2(t)]^{1/2} \qquad (28)$$
$$=1+as(t)+\tfrac{1}{2}a^2\hat{s}^2(t)+0(a^3) \qquad (29)$$

(29) follows from (28) via binomial expansion; the term $0(a^3)$ means terms of order $a^3$ and higher, for example $a^3s(t)\cdot\hat{s}^2(t)$, $a^4s^4(t)$, etc., which are progressively less significant.

From (29), when $|[as(t)]\text{minimum}|\ll 1$, $$|m(t)|\simeq 1+as(t) \qquad (30)$$

This indicates why conventional envelope detection, Method 3, is satisfactory when the carrier component is strong. In this symbolism, $a$ is inversely proportional to $c$, the carrier level of (15). The difference between Equations 29 and 30, i.e., $$\frac{a^2\hat{s}^2(t)}{2}+0(a^3)$$

is the distortion. The first component can be called "square-law distortion" and the $0(a^3)$ includes cubic, quartic, etc., distortion. The square-law term is generally the largest contributor to the total output distortion, and the approximate system which this invention has evolved is intended to eliminate square-low distortion completely.

Reference is made to FIG. 1, whose implementation will be simplified by means of functional approximations.

Consider first the "log" block 14. Using the appropriate series expansion for the natural logarithm and also Equation 29:

$$\ln|m(t)|=\ln\left[1+as(t)+\frac{a^2\hat{s}^2(t)}{2}+0(a^3)\right]$$
$$=as(t)+0(a^2) \quad (32)$$

where $0(a^2)$ includes all terms of order $a^2$ and higher. Thus $as(t)$ is a first-order approximation to $\ln|m(t)|$.

If one now takes the Hilbert transform:

$$H[\ln|m(t)|]-as(t)+0(a^2) \quad (33)$$

since H-transformation is a linear operation. Observe from Equation 29, however, that $$H[|m(t)|]=a\hat{s}(t)+0(a^2) \quad (34)$$

because H-transformation, while linear, does not preserve constants. Thus, to a first-order approximation, $$H[\ln|m(t)|]=H[|m(t)|]$$

This suggests that one can simplify the implementation of FIG. 1 by deleting the "log" element 14.

Proceeding to the "cosine" box element 22, and using the series expansion $$\cos x=1-x^2/2!+x^4/4!- \ . \ . \ .$$

and also Equation 33:

$$\cos[H\{\ln|m(t)|\}]=\cos[as(t)+0(a^2)]$$
$$=1-a^2\hat{s}^2(t)/2+0(a^3) \quad (35)$$

Using Equations 35 and 29 to describe the operation of the multiplier for element 32 in FIG. 1:

$$|m(t)|\cdot\cos[H\{\ln|m(t)|\}]$$
$$=[1+as(t)+a^2\hat{s}^2(t)/2+0(a^3)]$$
$$[1-a^2\hat{s}^2(t)/2+0(a^3)]=1+as(t)+0(a^3)] \quad (36)$$

which is the output signal.

If exact functional elements are used throughout as shown in FIG. 1, the $0(a^3)$ term in Equation 36 must be zero. If one deletes the "log" box element 14 for simplicity, $0(a^3)$ will not be zero but no square-law distortion will appear. One can in fact introduce more functional approximations without causing square-law distortion in the output.

Figure 3:
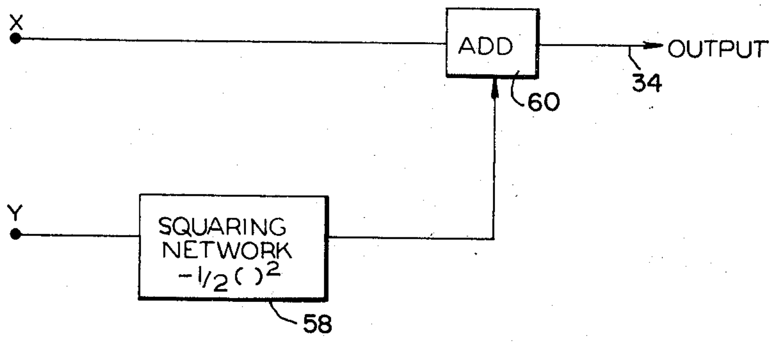
FIGURE 3 is to be read together with FIGURE 1, and illustrates a further modification of the present invention wherein the circuit element requirements are less stringent than those of FIGURE 2.

Specifically, Equation 36 indicates that square-law distortion is "cancelled' in the multiplier by the $$[-a^2\hat{s}^2(t)/2]$$

term in the cosine expansion. Thus we can replace the multiplier and cosine generator with an arrangement which is illustrated in FIG. 3.

The squaring network box element 58 may consist of simple nonlinear networks, for example square-law diodes. The adding network box element 60 may consist of ordinary resistors. Thus one can replace two relatively complicated mechanisms—the cosine generator 22 and the multiplier 32—with intrinsically simpler mechanisms while still suppressing square-law distortion.

Yet another simplification is possible. The approach thus far has been concentrated on simplifying the nonlinear functional elements in FIG. 1.

Considering the problem of the bandwidth limitations of an ASSB wave, one can use envelope-squaring to effect bandwidth compression. This method is useful only when the log element 14 is deleted, for while $|m(t)|^2$ is bandlimited, $\ln|m(t)|^2$ generally is not bandlimited.

Figure 4:
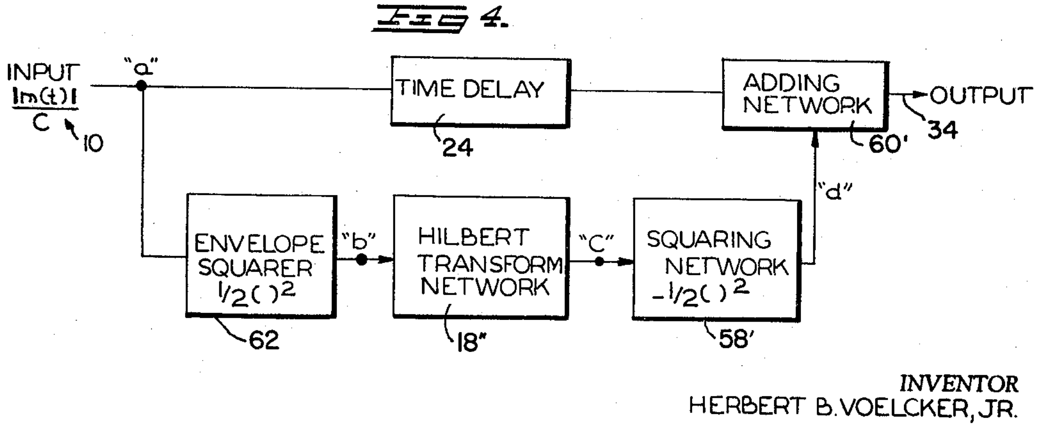
FIGURE 4 represents a further simplification of the receiver demodulation system according to the present invention.

This principle is incorporated into the simplified converter shown in FIG. 4. The H-transform network 18'', which is a —90° all-pass phase-shifter, need be operative only over the $s(t)$ information signal's bandwidth due to the aforementioned compression afforded by the envelope squaring. This not only simplifies the realization of the circuitry of the FIG. 1 ASSB converter significantly, but also lessens the amount of phase and delay compensation which must be provided.

Equations which show how the simplified converter of FIG. 4 operates are as follows:

At point *a*:

$$|m(t)|=1+as(t)+a^2\hat{s}^2(t)/2+0(a^3)$$

At point *b*:

$$|m(t)|^2/2=\tfrac{1}{2}+as(t)+0(a^2)$$

At point *c*:

$$H[|m(t)|^2/2]=a\hat{s}(t)+0(a^2)$$

At point *d*:

$$-\tfrac{1}{2}[H\{|m(t)|^2/2\}]^2=-a^2\hat{s}^2(t)/2+0(a^3)$$

Adding the *d* and *a* signals:

$$\text{Output}=1+as(t)+0(a^3)$$

Thus the simplified converter shown in FIG. 4 can remove all square-law distortion with relatively simple circuitry if higher-order, but generally lower power level, distortion can be tolerated. This higher order distortion can be decreased, usually significantly, by lowpass filtering to the $s(t)$-bandwidth of the final output, since much of it usually falls outside the $s(t)$ bandwidth. It is readily shown that this simplified converter is almost always significantly better than envelope detection alone.

It is emphasized that FIG. 4 illustrates but one of many possible approximate converter realizations. All such realizations, if logically based, must be representable as approximations to FIG. 1 or an equivalent exact implementation as in FIG. 2 of the phase-envelope determinism as ASSB waves. The accuracy of the functional approximations roughly determines how much of the inherent distortion will be removed from the ASSB envelope.

It should be further noted that, although the prior art has provided the so-called compatible SSB, stringent and precise signal processing has been required in the transmitter-modulator for such systems. If not sufficiently precise, spurious out-of-band components may be transmitted which will disturb other users of the radio frequency spectrum; also, the transmitted signal itself will contain intrinsic distortion. Approximations are applicable to the ASSB converter of the present invention because the converter is used in the reception process and hence spurious signals or distortion attributable to functional approximations need affect only the ASSB receiver user. According to the present invention in the ASSB transmitter spurious signals are simple to suppress because conventional SSB transmission-modulation technology is used. Generation of a precise compatible or square-law signal, as in the prior art, however, requires novel and intricate transmitter circuitry.

To compare the efficiency of the ASSB systems of the present invention with known systems of radio frequency signal modulation, a widely used measure of modulation efficiency is $$\eta=\text{Average-Sideband-Power/Total-Average-Power} \quad (37)$$

where Total-Average-Power is the sum of carrier power plus sideband power. ASSB can never be as efficient as the suppressed-carrier systems, SSB, (whose $\eta=1.0$), because of the requisite ASSB carrier component. This loss of efficiency is the small price one must pay for asynchronous receiver operation. Comparative measures follow from Equations 15 and 16, the equations for the ASSB and AM (amplitude modulated) forms of the information signal $s(t)$. If $\overline{s^2(t)}$ denotes the mean-square value of $s(t)$, then $\overline{s^2(t)}$ is a power measure normalized to one ohm because $$\text{Power}=\text{Average-of(voltage)}^2/\text{Resistance}$$

Thus:

$$\overline{s^2{}_{\text{ASSB}}(t)}=\tfrac{1}{2}[\overline{c^2}+2\overline{cs(t)}+\overline{s^2(t)}]+\tfrac{1}{2}\overline{\hat{s}^2(t)}$$
$$=\tfrac{1}{2}[c^2+2\overline{s^2(t)}] \quad (38)$$

because $\overline{s(t)}=0$ by convention and effectively in practice, and $s^2(t)=\hat{s}^2(t)$. Also:

$$\overline{s^2_{AM}(t)}=\tfrac{1}{2}[c^2+\overline{s^2(t)}] \quad (39)$$

Using Equations 38 and 39 in 37:

$$\eta_{ASSB}=\frac{\overline{2s^2(t)}}{c^2+\overline{2s^2(t)}} \quad (40)$$

$$\eta_{AM}=\frac{\overline{s^2(t)}}{C^2+\overline{s^2(t)}} \quad (41)$$

and, combining 40 and 41:

$$\eta_{ASSB}=\frac{2\eta_{AM}}{1+\eta_{AM}} \quad (42)$$

Equation 42 is a very useful equation which, for a given information signal, relates the efficiency of ASSB transmission to the efficiency of AM transmission. The equation is valid and fair because the carrier-strength constrain is the same for both waves, viz $[c+s(t)]\geqslant 0$.

For example: a carrier fully amplitude-modulated by a single tone yields an $\eta_{AM}$ of 33 percent, whereas the equivalent ASSB transmission is 50 percent efficient. A carrier fully amplitude-modulated by an ideal square wave is 50 percent efficient, while the ASSB form is 67 percent efficient. At low efficiencies ASSB is roughly twice as good as AM, ASSB also offers, of course, a 2:1 bandwidth saving.

However, the "crest factor" of ASSB is higher than that of AM but somewhat lower than that of suppressed-carrier SSB. ("Crest factor" is a measure, usually tailored to specific design problems, of the ratio of peak power to average power. A high crest factor means that a transmitter must be capable of delivering power for a brief interval considerably in excess of its long-term average rating, without generating significant spurious components. Transmitters for high-crest-factor waves are more expensive, for a given average power rating, than low-crest-factor transmitters.)

Examples have shown that ASSB is generally more efficient than the square-law SSB systems by a considerable margin, often by a factor of 2 or 3.

The foregoing description and the several drawing figures are illustrative of certain general aspects and specific examples of the manner of carrying out the present invention. However, it will be apparent that the invention is subject to modification; variation and change without departing from the spirit thereof; and that such invention is only to be limited by the meaning and scope of the subjoined claims.

What is claimed is:

1. The method of receiving signal information transmitted in a single sideband of wave energy which comprises the steps of detecting the envelope of the transmitted signal information wave, generating a first non-linear function of said detected envelope, generating a 90° Hilbert transformation of said non-linear function, generating a further nonlinear function of said Hilbert transformation and combining the resultant wave with the detected envelope of the transmitted wave to obtain an output signal which is a linear function representing the transmitted signal information.

2. The method of receiving signal information according to claim 1 wherein said first non-linear function generation produces the logarithm of said detected envelope.

3. The method of receiving signal information according to claim 1 wherein said first non-linear function generation produces the squared product of said detected envelope.

4. The method of receiving signal information according to claim 1 wherein said further non-linear function generation produces a trigonometric function.

5. The method of receiving signal information according to claim 1 wherein said further non-linear function generation produces a cosine function.

6. The method of receiving signal information according to claim 1 wherein said further non-linear function generation produces a squared function.

7. The method of receiving signal information according to claim 1 wherein said last step of combining is effected by multiplying the two factors.

8. The method of receiving signal information according to claim 1 wherein said last step of combining is effected by adding the two factors.

9. An asynchronous single sideband receiver for recovering signal information transmitted in a single sideband modulated wave, said receiver comprising means for detecting the envelope of the transmitted information wave, means to generate a first non-linear function of said detected envelope, means to generate a 90° Hilbert transformation of said non-linear function, means to generate a further non-linear function of said Hilbert transformation, said means being connected seriatim, as recited; and means to combine the resultant wave from such series-connected means with the detected envelope of the transmitted wave to produce an output signal which is a linear function of the transmitted signal information.

10. An asynchronous single sideband receiver according to claim 9 wherein said means to generate a first non-linear function of said detected envelope is a logarithmic network.

11. An asynchronous single sideband receiver according to claim 9 wherein said means to generate a first non-linear function of said detected envelope is a squaring network.

12. An asynchronous single sideband receiver according to claim 9 wherein said means to generate a further non-linear function is a cosine network.

13. An asynchronous single sideband receiver according to claim 9 wherein said means to generate a further non-linear function is a squaring network.

14. An asynchronous single sideband receiver according to claim 9 wherein said last-named means is a multiplier stage.

15. An asynchronous single sideband receiver according to claim 9 wherein said last-named means is an adder stage.

16. An asynchronous single sideband receiver according to claim 9 wherein said means to generate a further non-linear function and said last-named means comprise a single electron discharge circuit arrangement.

17. The method of regenerating a constrained single sideband modulated signal at a locally generated carrier wave frequency, given only the envelope of such signal, comprising the steps of generating a local carrier wave, amplitude-modulating the locally generated carrier wave with the envelope, and phase-modulating said locally generated carrier wave with a phase component related to the envelope and generated therefrom.

18. The method of claim 17, wherein said phase component is generated by taking the Hilbert transformation of the logarithm of said envelope.

19. The method of recovering a linear function of the signal information contained within the envelope of a constrained single sideband modulated signal which comprises the steps of regenerating the single sideband modulated signal at a locally generated carrier frequency by means of composite amplitude- and angle-modulation of the locally generated carrier frequency, and then synchronously demodulating such regenerated signal.

20. The method of recovering a linear function of the signal information contained within the envelope of a constrained upper sideband single sideband modulated signal represented by the function $$s_{ASSB}(t)=[c+s(t)]\cos\omega_o t-\hat{s}(t)\sin\omega_o t$$

where $c+s(t)\geqslant 0$ which comprises generating a signal from said modulated signal corresponding to the cosine of the Hilbert transform of the log of the envelope of the function $S_{ASSB}(t)$ normalized to the carrier level, and multiplying said signal by the envelope signal to thereby obtain the information signal and a signal corresponding to the carrier level of the modulated signal.

21. The method of recovering a linear function of the signal information contained within the envelope of a constrained lower sideband single sideband modulated signal represented by the function $$s_{ASSB}(t)=[c+s(t)]\cos\omega_0 t+\hat{s}(t)\sin\omega_0 t$$

where $c+s(t)\geqslant 0$ which comprises generating a signal from said modulated signal corresponding to the cosine of the Hilbert transform of the log of the envelope of the function $S_{ASSB}(t)$ normalized to the carrier level, and multiplying said signal by the envelope signal to thereby obtain the information signal and a signal corresponding to the carrier level of the modulated signal.

22. The method of demodulating an asynchronous single sideband signal comprising the steps of:

(a) generating a normalized envelope signal $$\frac{|m(t)|}{c}$$

where $|m(t)|$ corresponds to the envelope of the modulated signal and $c$ corresponds to the carrier level, (b) developing a signal corresponding to the natural logarithm of the normalized envelope signal, (c) generating a signal corresponding to the Hilbert transform of said last developed signal, (d) generating a further signal corresponding to the cosine of said last generated signal, and (e) multiplying said further signal by the envelope signal to thereby obtain the information signal and a signal corresponding to the carrier level.

References Cited

UNITED STATES PATENTS

| | | | |
|---|---|---|---|
| 2,987,683 | 6/1961 | Powers | 332—45 |
| 2,989,707 | 6/1961 | Kahn | 332—45 |
| 3,050,700 | 8/1962 | Powers | 333—29 |

ROBERT L. GRIFFIN, Primary Examiner

R. S. BELL, Assistant Examiner

U.S. Cl. X.R.

325—49; 332—44